US012102588B2

(12) United States Patent
King

(10) Patent No.: US 12,102,588 B2
(45) Date of Patent: Oct. 1, 2024

(54) POWERED WALKING ASSISTANCE DEVICE WITH CANE PORTION USED AS JOYSTICK CONTROLLER

(71) Applicant: James L King, Bella Vista, AR (US)

(72) Inventor: James L King, Bella Vista, AR (US)

( * ) Notice: Subject to any disclaimer, the term of this patent is extended or adjusted under 35 U.S.C. 154(b) by 898 days.

(21) Appl. No.: 16/999,502

(22) Filed: Aug. 21, 2020

(65) Prior Publication Data

US 2022/0054346 A1 Feb. 24, 2022

(51) Int. Cl.

| | |
|---|---|
| ***A61H 3/04*** | (2006.01) |
| ***A45B 3/00*** | (2006.01) |
| ***A45B 9/02*** | (2006.01) |
| ***A45B 9/04*** | (2006.01) |
| ***A61H 3/02*** | (2006.01) |

(52) U.S. Cl.

CPC ................. *A61H 3/04* (2013.01); *A45B 3/00* (2013.01); *A45B 9/02* (2013.01); *A45B 9/04* (2013.01); *A61H 3/02* (2013.01); *A61H 2003/043* (2013.01); *A61H 2201/1207* (2013.01); *A61H 2201/503* (2013.01)

(58) Field of Classification Search

CPC ................................................ A61H 2003/043

See application file for complete search history.

(56) References Cited

U.S. PATENT DOCUMENTS

| | | | | |
|---|---|---|---|---|
| 5,097,856 | A * | 3/1992 | Chi-Sheng | G01S 7/4813 704/271 |
| 5,687,136 | A * | 11/1997 | Borenstein | A61H 3/061 367/910 |
| 8,418,705 | B2 * | 4/2013 | Ota | A61H 3/04 700/71 |
| 10,052,253 | B2 * | 8/2018 | Shirato | A61H 3/04 |
| 10,449,108 | B2 * | 10/2019 | Yamada | A61H 3/04 |
| 10,597,100 | B2 * | 3/2020 | Gerhardt | B62D 63/025 |
| 10,667,978 | B2 * | 6/2020 | Takizawa | A61H 3/04 |
| 10,914,591 | B2 * | 2/2021 | Li | G06K 7/10366 |
| 2012/0279539 | A1 * | 11/2012 | Kim | A61H 3/068 135/66 |
| 2014/0116484 | A1 * | 5/2014 | Demski | A61H 3/02 135/71 |
| 2021/0155278 | A1 * | 5/2021 | Raja | A61H 1/00 |
| 2021/0298986 | A1 * | 9/2021 | Aoki | A61H 3/04 |

* cited by examiner

*Primary Examiner* — Noah Chandler Hawk

(57) ABSTRACT

An electronic walking assistance device, has a cane portion, having surfaces for holding against arms and/or hands of a user; and an electromotive device, which automatically creates motion to follow a movement of the user, enabling walking assistance without lifting the handle portion or the electromotive device off the ground.

1 Claim, 7 Drawing Sheets

POWERED WALKING ASSISTANCE DEVICE WITH CANE PORTION USED AS JOYSTICK CONTROLLER

BACKGROUND

There are different kinds of walking assist devices, including walking canes, walking staffs, walkers, and crutches.

A conventional walking assist device has a flat bottom, and a user presses that flat bottom against the ground and uses the stable support provided by the flat bottom, to walk next to the support.

SUMMARY OF THE INVENTION

The inventor recognized, however, that there are a number of drawbacks with the current systems.

An embodiment describes a power assisted walking device, referred to in embodiments as a “cane”, which includes a walking cane, walking staff, an Under arm crutch, a Horizontal forearm crutch, a walker, or any other walking assistance device.

An embodiment describes a walking assistance device with an electro motive device that automatically follows the user’s movements, without the device lifting off the ground.

DETAILED DESCRIPTION

An embodiment describes a walking assistance device which uses an electromotive device that responds to direction of user movements as a powered walking assistance. In an embodiment, the electromotive device uses a hover shoe which is a device which has a self leveling pad that detects the direction of the user’s leaning in order to provide motive force in that direction. Leaning forward typically causing the device to go forward, standing up straight up allows coasting and slightly leaning backwards provides a braking action. On both the Segway™ and Inventists™ Hover Shoes, the pressure sensitive pad is disabled. The reason is that the pressure sensitive pad senses the rider standing on it, and enables the electronics to use the self leveling circuits to respond to the tilting of the tactile joystick controller, as described herein.

According to embodiments, a walking assistance device uses the cane portion of the walking assistance device as a joystick, referred to herein as a tactile control joystick, to control a powered device by tilting the tactile control joystick in place of the normal leaning done by the operator of the Hover Shoe. The tilting of the tactile joystick controller becomes the controller to cause the electromotive Hover Shoe to be powered on; and the degree of tilt regulates the increase in speed of the Hover Shoe.

In an embodiment, where the device is shadowing the movement of the person, the device is used by holding the hand and forearm stationary with respect to the body. When the body moves forward, backs up or turns, the tilting action of the cane/staff automatically tilts the self leveling feature of the Hover Shoe or Hover Board, causing movement to a position where the device is levelled.

The walking assistance device also follows a user when the user turns. The user holds their hand stationary with respect to the body. When the user turns, this automatically turns the cane handle. The handle is linked to the Hover Shoe mechanically through the staff. The whole system turns together, mechanically following the user, using the handle as a joystick.

An embodiment may include additional steering linkage. A major advantage of a Hover Board is that its wheel separation provides the user significant lateral stability. The action of turning the handle acts through the steering mechanism to change the level of the upper surface, to appropriately energize the motors. If the body is just moving forward or backwards, this only tilts the staff backwards or forwards, which causes the self leveling feature of the hoverboard to energize the motors equally. This causes the Hover Board to only move forward or backward in a straight line, following the user’s motion. Tilting the tactile control joystick side to side preferentially energizes one motor relative to the other, causing the hover board to move to one side or the other.

Figure 1:
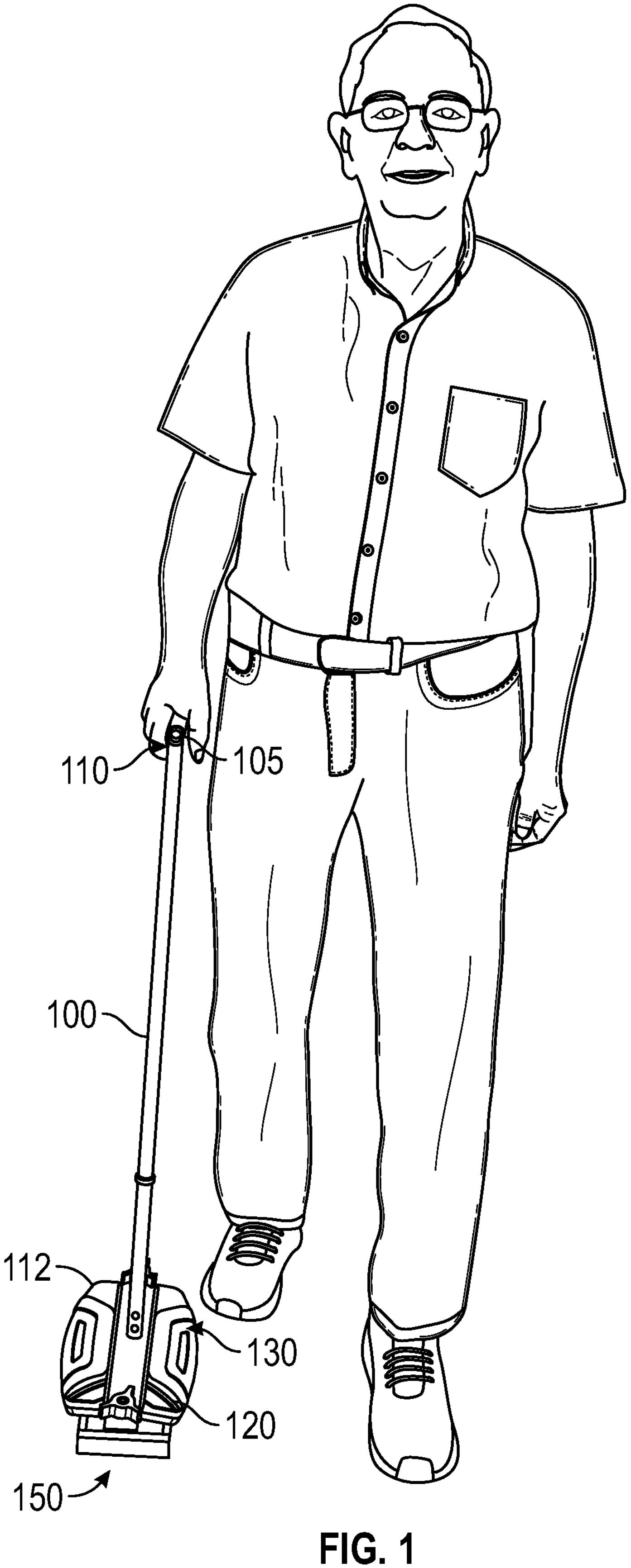
FIG. 1 shows a first embodiment where the walking assistance device is a walking cane/walking staff.

Multiple embodiments are described herein, each using a walking cane type device, attached by a joystick connection, a tactile control joystick, connected to an electromotive device of a type which responds to direction of force on a surface. An embodiment is shown in FIG. 1, providing an embodiment used as a walking cane 100.

Most walking assistance devices have an adjustable height. For example, in a standard walking cane, there is a lower round tubular section that has a snap pin inside that protrudes through a single hole in the cane’s lower section. The hole is located approximately ¼ of the distance up from the bottom of the cane. The pin is retained by a U shaped spring that fits inside the lower section. The U shaped pin holds the spring securely in the hole. The spring force is such that a person’s index finger can depress the snap pin and allow raising or lowering the cane length.

The upper portion of the cane’s inside diameter is sized to be a slip fit over the lower portion of the cane to move up and down.

To change the height of the handle, the snap pin in the lower section of the cane is depressed and the upper portion of the cane is rotated slightly. This slight rotation prevents the snap pin from locking into the next adjacent hole in the upper portion of the cane. The upper portion is then slid to the desired handle height. The closest hole in the upper portion of the cane is then aligned with the snap pin. The upper portion is locked to the desired handle height by the action of the snap pin interlocking with the hole in the upper cane portion.

A control, e.g., on off switch 110, is located in or near the handle of the cane, to be operated, for example, by the index finger of the user. The electromotive device 120 is controlled by the on off switch. The electromotive device 120 responds to movement of the handle to move in the direction of the force applied to the top surface 121 of the electromotive device 120.

The electromotive device 120 is connected by a staff mount 130 to the bottom portion 112 of the cane. In operation, the top portion 105 of the cane, where the user holds the cane, forms a tactile control joystick staff, which enables instigating the electromotive device 120 to move forwards, backwards, and side to side, and to enhance steering. This causes the power unit, and hence the cane, to follow the user's movements.

Figure 1A:
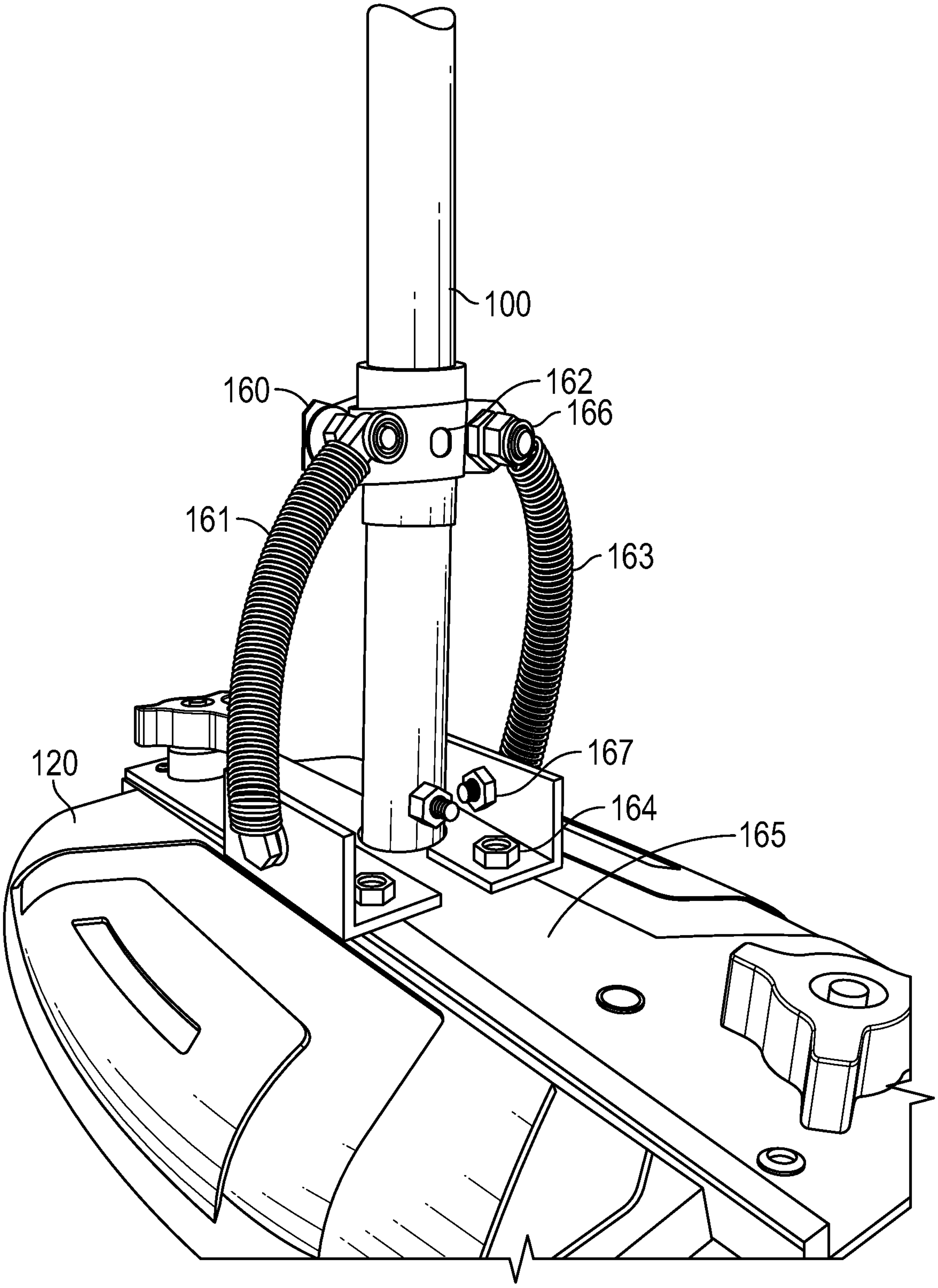
FIG. 1A shows the tactile joystick controller connection that forms an interface between the walking cain and the electromotive device.

The tactile joystick connection 130 is shown in further detail in FIG. 1A.

The tactile joystick connection 130, shown in FIG. 1A allows tilting of ±10 degrees side to side on the bolt/axle. The top portion of the joystick connection 130 is connected to the cane 100. The bottom portion of the joystick connection 130 is connected to the power unit 120. The cane 100 ends at an extension spring assembly 160 which includes first and second extension springs. The first extension spring 161 is connected between a first bracket 162 that is attached to the cane, and a second bracket 165 that is attached to the power unit 120. The bracket 162 also includes a second extension spring 163 attached to an opposite side bracket 164. Each of the extension springs 161 and 163 are straight extension springs approximately 4 inches long, with both ends of the expansion springs restrained by nuts and bolts. The nuts and bolts such as 166, 167 hold the extension springs stationary when locked by lock nuts. This prevents the spring loops from rotating. This allows the unit to tilt plus and minus 10° side to side on the bolt axle, but not to rotate, and not to pivot forward or backward.

The bent straight springs allow assistance with the steering of the power unit 120 using the tilting tactile joystick staff ("TTJS") operation. As the joystick tilts towards one spring, the tension in that one spring increases and the opposite spring tension decreases. The TTJS bolt axle at the base of the staff allows the staff to tilt side to side but be rigid in a forward and backwards direction. This allows a self centering operation where the tactile control joystick staff always returns to a neutral 90 degree vertical position. This side to side tilting ability of the tactile control joystick staff and being rigid forward and backwards allows the tactile control joystick staff to tilt side to side with respect to the base until and still simultaneously control the forward and backwards force on the tactile control joystick thereby controlling the speed of the power unit.

The operation of following the user's movements occurs by holding the handle stationary relative to the body. Any movement of the body is transferred to the tactile control joystick staff 130 and the power unit 120 then senses that movement and automatically follows the user's motion. However, up to 10 degrees of side to side movement is absorbed by the springs, thus preventing the power unit from turning unless more than 10 degrees of side to side force is applied.

In an embodiment, there are parking stands 150 with bumper bars at front and back to prevent the device from running into something and causing damage. The front bumper bar has two charging terminals enabling charging of the device.

The back bumper bars are for impact resistance. Both bumper bars also operate for parking. In addition, in one embodiment, the bumper bars can be illuminated with LED lights that shine through the bumper bars. The bars can create a stable platform to assist with sitting or standing.

Figure 5:
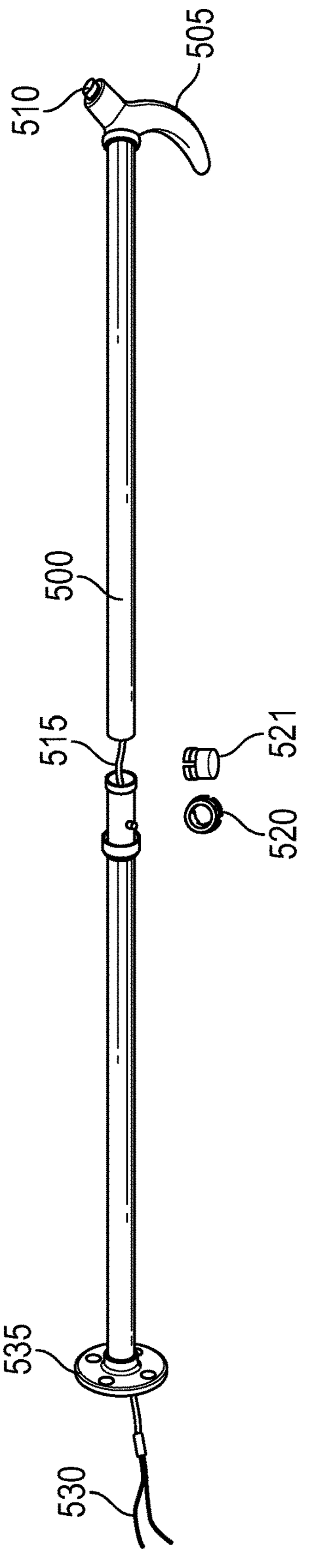
FIG. 5 shows a wiring harness attachment between the handle switch and an adjustable height bottom.

In addition, since the cane part is adjustable in height, a height adjustment wire adaption device is used as described herein with reference to FIG. 5. The height adjustment wire device is located inside the cane 100, and is described with further detail with relative to FIG. 5.

The walking assistance device in another embodiment can be a walking staff, and the cane includes a single pole with a lower horizontal handle and vertical ergonomically tilted handle.

Figure 2:
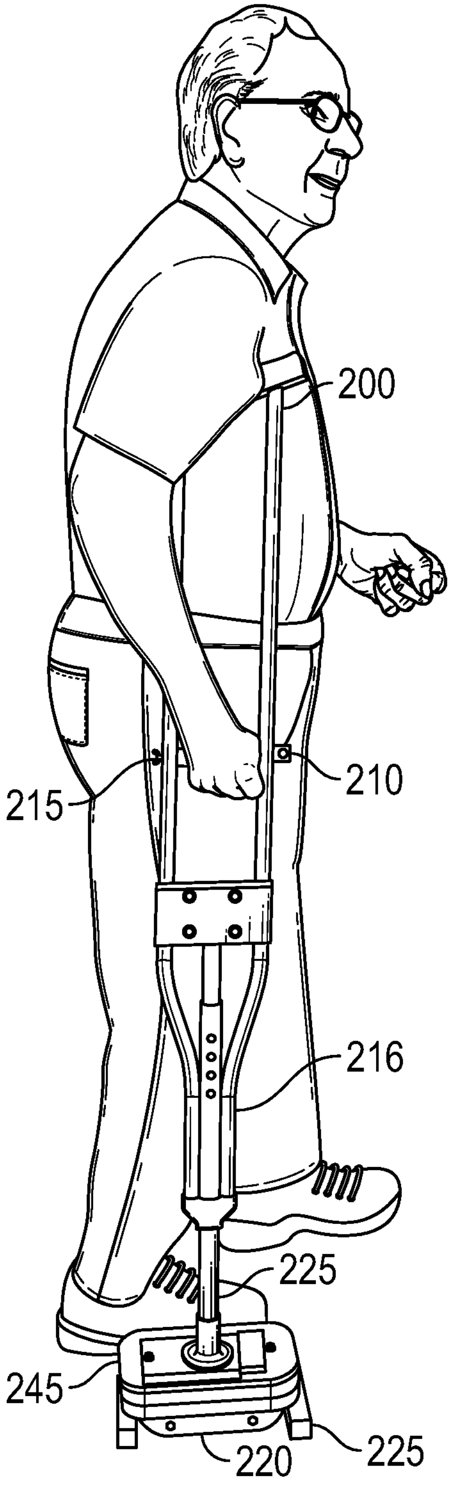
FIG. 2 shows an embodiment where the walking assistance device is an under arm crutch.

FIG. 2 shows an embodiment where the system is applied to an underarm crutch. As with the other embodiments, the underarm crutch uses a tactile joystick staff for causing the self levelling power unit 220 to follow the user's movements. The underarm crutch 200 is located beneath an underarm of the user, as conventional. The user then holds onto grip handle 215 with their hand. The grip handle 215 is generally at the center of the crutch device.

The on-off switch 210 is located near the user's hand position, for example on the outside of the crutch at the end of the center grip handle 215.

A height adjustment part 216 uses a snap pin system as described above to adjust the height. The bottom part of the crutch 225 connects to the self leveling power unit 220 via the tilting tactile joystick staff connection, shown in FIG. 1A.

Figure 3:
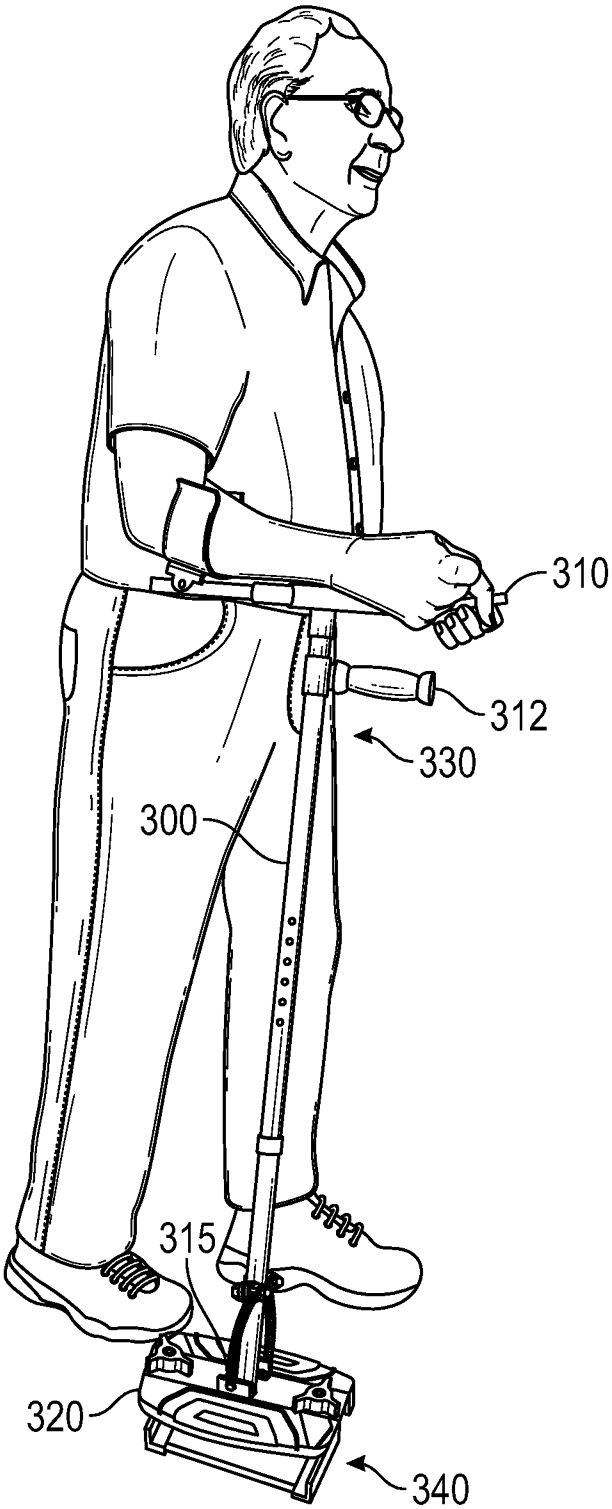
FIG. 3 shows an embodiment where the walking assistance device is a horizontal forearm crutch.

FIG. 3 shows a modified device where the cane 300 is a horizontal forearm crutch 300. The on-off switch is located on the handle 310. An adjustable height pin locking system 320 allows changing the height of the crutch staff 300 to fit properly to a user's height. The distal end 330 of the crutch staff 300 is modified to attach to the top portion of the self leveling power unit 320, via a tilting tactile joystick staff attachment 315 of the type shown in FIG. 1A. This allows the operator to tilt the forearm crutch 10° side to side. It also allows the single motor/wheel to remain in intimate contact with the floor and also enhances the steering. The motive force is provided by the user moving relative to the self levelling platform 320.

In all the embodiments described herein, there can also be add-on devices shown as 312.

This can include bicycle add-ons like a bell, cell phone holder, flashlight, rearview mirror, or other bicycle accessories. This can also carry a water bottle holder or small carry bag. The powered add ons can be battery powered, or can be powered via wires attached to the self levelling platform 320.

FIG. 4 shows an embodiment where the walking assistance device is a walker 400, where the cane portion 405 is formed by a modified crutch staff 405 of adjustable height that uses a height adjustment mechanism 410. The handles 402 are horizontal handles attached to the top of the crutch staff 405, with a switch 401. In an alternative embodiment, there can be one switch 401 in each side of the handle 402.

Figure 4A:
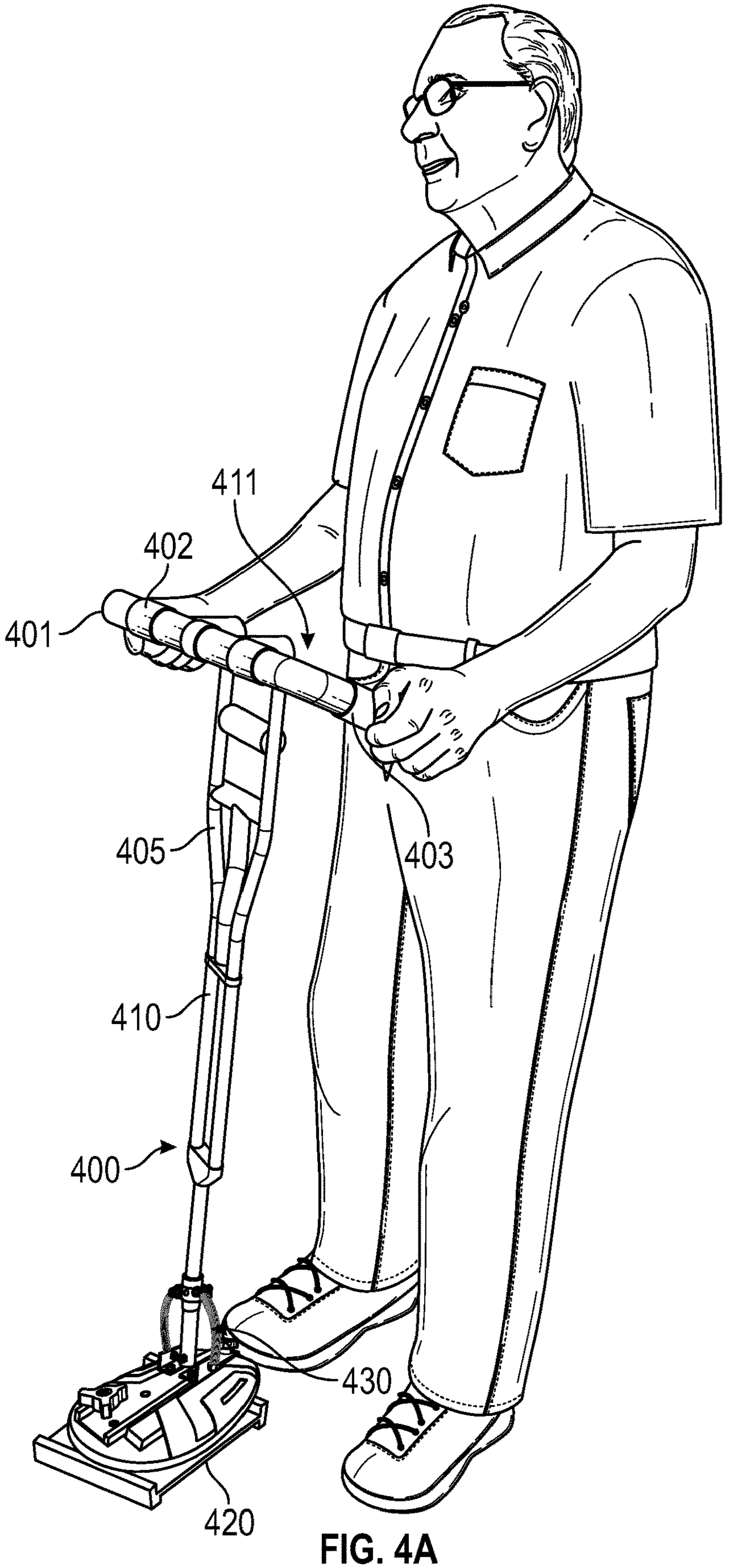
FIG. 4A shows an embodiment where the walking assistance device is a walker.
Figure 4B:
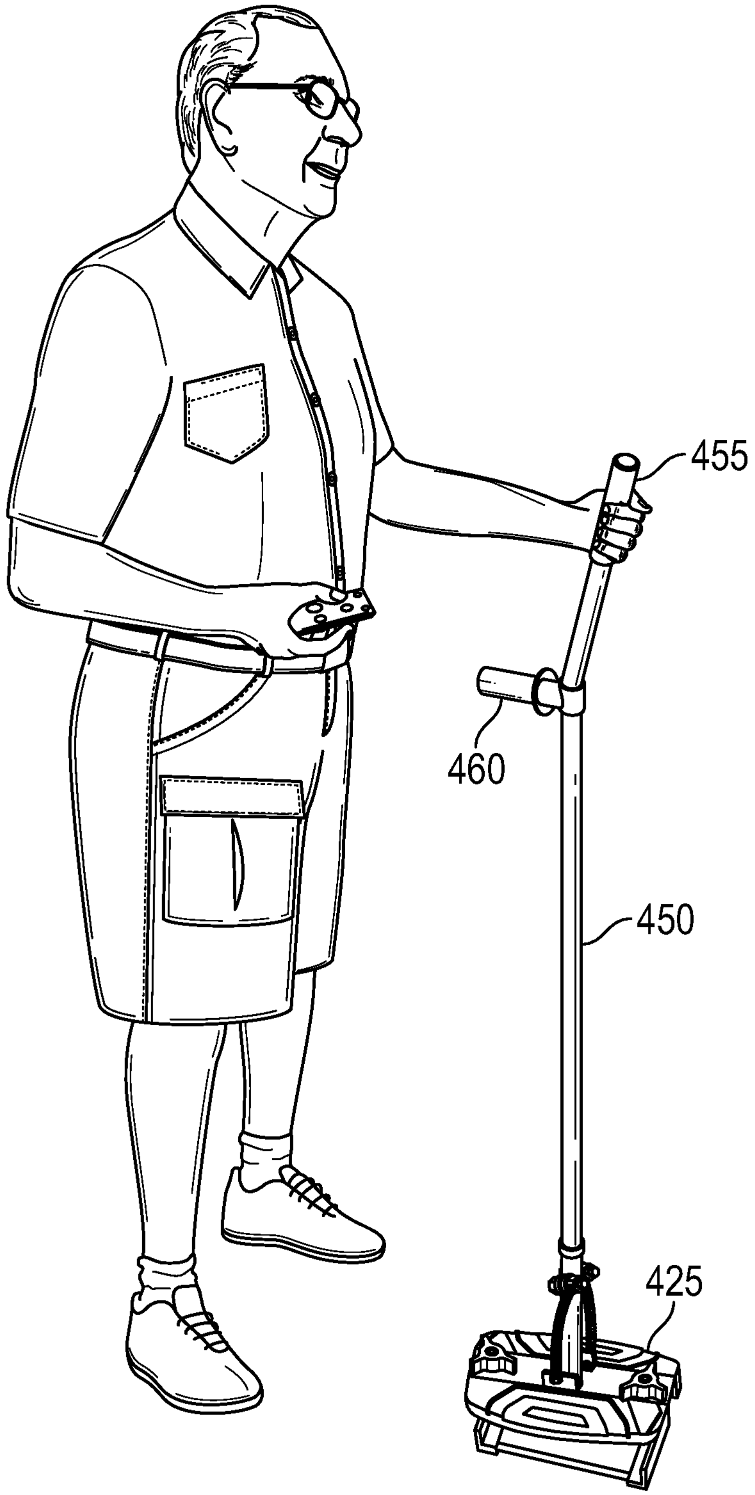
FIG. 4B shows an embodiment, where the walking assistance device is a walking staff.

FIG. 4B shows an embodiment where the walking assistance device is a walking staff. The walking staff 450 is attached to the electromotive device 475 via a TTJS connection as in the other embodiments. The Walking Staff is used in a normal manner as a Trekking Staff, by holding the top handle 455. When used as a Trekking Staff, the top handle's 10° tilt is for ergonomic purposes. As shown in FIG. 4A, the 10° angle fits the common grasp tilt of a normal hand.

There is also a cane type handle 460 being used to lift the staff with an open hand. This is feature allows people with impaired grip issues to lift the staff without gripping.

When used as a Trekking Staff the top Tilted Handle 455 is a joystick. The horizontal Handle 460 has two uses: Lifting—over thresholds and curbs or to obtain motion, used as a joystick.

The second handle can be added in this way to any of the embodiments described herein.

There can also be assistive add-ons as in previous embodiments shown as 411. The add-on here is shown as a bell, but this can also be a cell phone holder, flashlight, rearview mirror, video camera, water bottle holder or carry bag. Addition of a water bottle or carry bag will require zeroing the self leveling aspect of the base.

In the embodiment, the handles 402 are ergonomically tilted downward at the area 403 to make it easier to hold onto the walker. The crutch staff has an adjustable height which is adjusted via an adjustment adjustable height mechanism 410. This connects to the self levelling drive mechanism 420 by a tactile control joystick or TIS or TTJS 430 which is similar to that shown in FIG. 1 as in the other embodiments.

An important feature of the walker is the ability to adjust the height of the walker. However, Since this is used as a walking assistance device, it is desirable, or perhaps even necessary, that the on-off switch be in one or both of the handle portion of the cane. However, this means that the electronics from the switch needs to be conducted, via wires, from that upper portion, to the self-leveling drive mechanism at the bottom of the device. Typically, this uses a momentary on-off switch, and wire, e.g., 18 gauge wire.

However, the inventor found that the wire that runs from the Hover Shoe to the handle can fold over on itself and can pinch when the upper portion of the cane's handle is height adjusted. If the user performs the normal remedy of pushing down harder on the handle, this jams the wires harder together and locks the upper portion in place. This has the effect of preventing the adjustment, since this can pinch the wires.

In this embodiment, the wire used is like a coiled phone wire on a telephone handset. Its purpose is to stretch and retract to keep the handset wire from becoming entangled and to also make the handset wire as short as possible.

A two wire telephone handset coiled wire was used to wire the switch but it has disadvantages:

A first disadvantage is that the wire jacket is too large so when the coiled wire is manufactured the diameter of the coil is too large to fit inside a standard cane tube.

The telephone wire plastic jacket is not a slippery finish so it contributes to the coiled wire's tendency to jam.

The plastic jacket of the telephone handset wire is also much larger than is necessary to insulate the conductors low voltage conductors from the metal wall of the cane tube.

According to an embodiment, a solution to the problem is to use a two conductor, 18 ga, silicone plastic, insulated wire, that is coiled. The coils are created by wrapping them in a fixture that has a small diameter (approx. ¼" diameter) metal rod. The fixture securely holds both coil ends. The coil is wrapped in the center of a length of wire. The number of coil wraps must be controlled to assure the stretched and contracted length is adequate for the application it is to be used in. The unwrapped ends must also be long enough to reach their desired destinations depending on which My Shadow embodiment they are installed in. The silicon insulated wire prevents the wire from sticking to the inside of the cane tube. A heat gun is used to heat the wire insulation to the point of being plastic, but not melting. The wire is then cooled, e.g., in a refrigerator. This is a preferable cooling method because it assures the wire insulation takes a set and retains its coiled condition.

Most canes have plastic nylon bushings that are inserted into the top end of the lower cane tube. The nylon bushing is used to remove the looseness of the slip fit of the upper and lower cane tubes. The canes are designed to have three to four plastic sections that compress when the lower tube is inserted into the upper tube, In an embodiment, this plastic insert is used as an anchor point for the coiled wire. This anchoring is necessary because the upper cane section is moving away or towards the lower tube section when the cane height is adjusted.

The cane or staff is attached to a removal base. Unplugging the switch control wire and loosening the clamping knobs will allow attachment of the Tactile Control to any hover board or hover shoe.

Other anchoring points can alternatively be used.

The wire that is in the lower portion must be restrained so no force is exerted on the plug connection between the Hover Shoe and the lower cane tube. This restraint is accomplished by tying a simple once over knot in the wire.

The wire is inserted through the nylon plastic insert, which is hollow, and then the wire is routed through the lower tube. After pulling the wire through the lower cane tube section, the plastic insert is installed by pushing it into the top of the lower tube. The upper tube with the coil in it is installed over the nylon bushing and over the lower cane tube. When the handle height is increased the knot (or similar wire restraint) contacts the plastic insert and the coiled wire is forced to be restrained and forced to uncoil without straining any wire connections.

In an embodiment, the upper coil's wire end is restrained by being routed through a 90 degree turn to reach the switch in the handle. If there is no 90 degree turn, then another form of upper wire restraint must be provided.

The My Shadow Horizontal Forearm Crutch is not a form of crutch that is operable like existing Standard 45° Forearm Crutch or a tilted 80°/10° Crutch. The reason is that the current embodiments all require the crutch to be lifted after bearing the weight of the user. In the weight bearing phase, the user moves the body forward. Then the crutch is lifted and advanced and placed on the ground awaiting the next weight bearing phase. The My Shadow Horizontal Forearm Crutch exists as an assistive walking device but the forearm must be retained by a strap system. There are two basic reasons: First it would require strapping or restraining the crutch to the elbow end of the forearm. Second, the hand would need to grasp the front of the crutch or the front of the forearm restrained by straps to the crutch. Both the forearm restraint and grasping the handle are absolutely necessary to pick the crutch up and move it forward.

None of the walking assistance devices of any of the embodiments, require lifting off the ground. The My Shadow Horizontal Forearm Crutch, or My Shadow 45° Forearm Crutch or the My Shadow Underarm Crutch does not spend any time off the ground. This is possible because the base power unit can carry the full weight of the user 100% of the time. The current existing crutch designs cannot advance and be weight bearing at the same time. The current forearm crutches must have a means to cause the crutch to follow the user's forearm. If it does not follow the user's forearm, then it cannot be advanced. Addition of a My Shadow power supply eliminates the need to lift any of the My Shadow Crutches to Advance them. In addition the My Shadow concept follows the users every horizontal body movements.

The My Shadow concept can be adapted to any forearm crutch on the market. The Staff of any existing crutch can be modified to act as a (TCS) Tactile Control Staff, or (TJS)

Tactile Joystick Staff, or (TTJS) Tactile Tilting Joystick Staff to control the powered base unit.

While the above has described a first embodiment using a walking cane, it should be understood that additional embodiments operate similar subject matter in order to provide different kind of walking assistance devices. FIG. 2 for example, shows an underarm crutch. In the underarm crutch, for example, the on-off switch can be located on 210 while the crutches 200 and the switch 210 can be located on the outside of the crutch at the end of the center grip handle 215. The crutch is height adjustable, using a button and whole system 215. This connects to the hover shoe device 220. The connection provides mounting the crutch staff to the self leveling platform, SLP.

Figure 6:
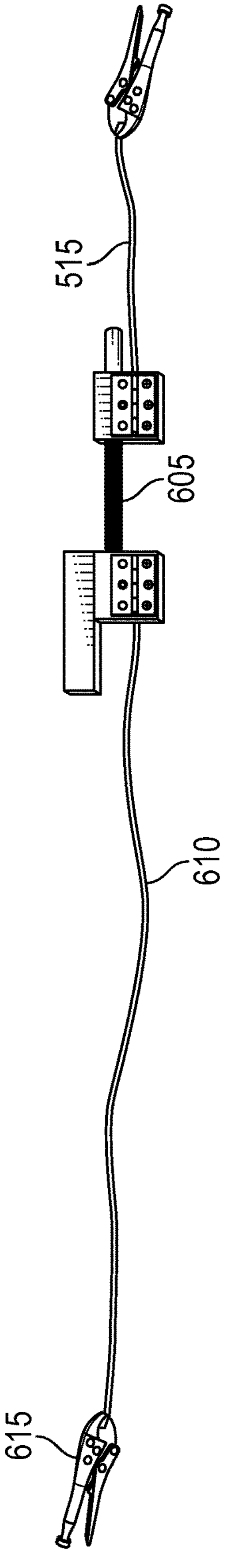
FIG. 6 shows the wiring harness used inside the cane.

An exploded view of the device is shown in FIG. 5, which shows the exploded view where the cane part is actually a walking cane 500, having handle 505. A switch 510 is placed in the handle, connected via a wire shown as 515. FIG. 6 shows the wiring harness, showing the wire that is placed inside the cane. In an embodiment, this is a coiled wire extension 515 which extends from the switch in the handle, or the wire extension 515 extends to a coiled wire extension 600 which is a coiling fixture with the coiled wire in place. This is located in the upper cane tube. This coiled wire extension then extends from the coiling part 605 via another wire extension to a lower coiled wire extension 615. This is threaded down to the inner the end piece. Nylon bushings 520, 521 are used to reduce looseness between the upper and lower cane tubes. The first coil part 605 is located in the upper part of the cane, and the second coiling part extends through the nylon bushings, ending in the plugged plug-in connectors 530 that connect to the motor of the electromotive device, e.g., hover board. Note also the hover board or hover shoe plate 535 which connects the top of the hover board, enabling the angling of the cane to form a joystick for controlling the hover board.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic walking assistance device, comprising:

a cane portion, having surfaces for holding against arms and/or hands of a user;

an electromotive device, which automatically creates motion to follow a movement of the user, enabling walking assistance without lifting the electromotive device off the ground;

a tactile joystick connection between the cane portion and the electromotive device, which translates forward and backwards motion by the user into a tilting action against the electromotive device that causes forward or backward movement of the electromotive device, and where the tactile joystick connection allows side to side movement of a specified amount without translating that into movement of the electromotive device wherein the cane ends at an extension spring assembly that has extension springs on the first and second sides that allow the side to side movement of the specified amount.

* * * * *